US012564954B2

(12) United States Patent     (10) Patent No.: US 12,564,954 B2
Moon et al.     (45) Date of Patent: Mar. 3, 2026

(54) MULTI-AXIS ROBOT WITH ADJUSTABLE END OF ARM TOOL

(71) Applicant: BACA SYSTEMS, LLC, Orion Township, MI (US)

(72) Inventors: Whitney Moon, Corning, NY (US); Ryan Fossett, Hazel Park, MI (US); Rhett King, Oxford, MI (US)

(73) Assignee: BACA SYSTEMS, LLC, Orion Township, MI (US)

( * ) Notice: Subject to any disclaimer, the term of this patent is extended or adjusted under 35 U.S.C. 154(b) by 190 days.

(21) Appl. No.: 18/240,420

(22) Filed: Aug. 31, 2023

(65) Prior Publication Data

US 2024/0091939 A1    Mar. 21, 2024

Related U.S. Application Data

(60) Provisional application No. 63/408,542, filed on Sep. 21, 2022.

(51) Int. Cl.
*B25J 9/16*     (2006.01)
*B25J 11/00*    (2006.01)
*B26F 1/26*    (2006.01)

(52) U.S. Cl.
CPC ......... *B25J 9/1664* (2013.01); *B25J 11/0055* (2013.01); *B26F 1/26* (2013.01)

(58) Field of Classification Search
CPC .... B25J 9/1664; B25J 11/0055; B25J 9/1643; B25J 9/1679; B25J 5/02; B25J 9/162; B25J 9/1656; B25J 11/006; B26F 1/26; B26F 3/004; B26F 2001/388; G05B 2219/40252; G05B 2219/40354; G05B 2219/45068; G05B 2219/40328; G05B 2219/40331; G05B 2219/40333; G05B 2219/36263; G05B 2219/45036; G05B 2219/45044; G05B 2219/50351
See application file for complete search history.

(56) References Cited

U.S. PATENT DOCUMENTS

| | | | |
|---|---|---|---|
| 7,092,791 B2 * | 8/2006 | Terada | .................. B23K 26/28 901/41 |
| 9,110,456 B2 | 8/2015 | Zhang et al. | |
| 10,525,594 B2 | 1/2020 | Ogata | |
| 10,591,891 B2 | 3/2020 | Rydh | |
| 2014/0015185 A1 | 1/2014 | Hishikawa | |
| 2017/0113324 A1 * | 4/2017 | Romanoff | .............. B24C 1/045 |

(Continued)

FOREIGN PATENT DOCUMENTS

CN     211662470     10/2020

*Primary Examiner* — Esvinder Singh
(74) *Attorney, Agent, or Firm* — Carlson, Gaskey & Olds, P.C.

(57) ABSTRACT

A robot system includes an articulated robot having a base near one end, a wrist flange near an opposite end, and a plurality of robot portions between the base and the wrist flange. A cutting tool is secured to the wrist flange and selectively moveable about at least one tool axis to change an angle of orientation of the cutting tool. A controller coordinates movement of the robot portions and at least one change in the angle of orientation of the cutting tool to move the cutting tool in an uninterrupted manner along a continuous cutting path to cut a slab of material while avoiding a singularity condition in which any two of the robot's axes are collinear.

19 Claims, 2 Drawing Sheets

(56)     References Cited

U.S. PATENT DOCUMENTS

2018/0290393  A1*  10/2018  Bloch  ..................... B32B 37/06
2020/0139546  A1*   5/2020  Kerfeld  ............... B25J 11/0055
2022/0118640  A1*   4/2022  Brinkmeyer  ........... B27B 15/08
2022/0410347  A1*  12/2022  Hashish  ................. B26F 3/004
2023/0311347  A1*  10/2023  Demmeler  .............. B25J 21/00
                                                        219/136

* cited by examiner

MULTI-AXIS ROBOT WITH ADJUSTABLE END OF ARM TOOL

CROSS-REFERENCE TO RELATED APPLICATION

This application claims priority to U.S. Patent Application No. 63/408,542 filed Sep. 21, 2022, which is incorporated herein in its entirety.

BACKGROUND

Robots have proven useful for a variety of purposes. Some examples include manufacturing and assembly processes. Some robots have been used for cutting slabs of material, such as stone. Mitered or angled cuts can be difficult to achieve. The typically limited range of motion of a robot and the need to avoid singularity impose limitations that can make such cutting systems unusable for various jobs including cutting large sized slabs.

SUMMARY

An illustrative example embodiment of a robot system includes an articulated robot having a base near one end, a wrist flange near an opposite end, and a plurality of robot portions between the base and the wrist flange. The robot portions are moveable about respective axes relative to at least one other of the robot portions. A support, which is secured to the base, is moveable for selectively changing at least one of a location or an orientation of the base. A cutting tool is secured to the wrist flange and selectively moveable about at least one tool axis to change an angle of orientation of the cutting tool relative to the wrist flange. A controller is configured to coordinate movement of the plurality of robot portions and the support and at least one change in the angle of orientation of the cutting tool relative to the wrist flange to move the cutting tool in an uninterrupted manner along a continuous cutting path to cut a slab of material at an oblique angle relative to a primary face of the slab while avoiding a singularity condition in which any two of the robot's axes are collinear.

In an example embodiment having one or more features of the robot system of the previous paragraph, the controller is configured to maintain the wrist flange in an orientation relative to the primary face of the slab along the continuous cutting path such that an angle between the wrist flange and the primary face of the slab is between 0° and 25°.

In an example embodiment having one or more features of the robot system of any of the previous paragraphs, the angle is between 0° and 15°.

In an example embodiment having one or more features of the robot system of any of the previous paragraphs, the angle is up to 10°.

In an example embodiment having one or more features of the robot system of any of the previous paragraphs, the controller is configured to maintain the wrist flange parallel to the primary face of the slab along the continuous cutting path.

In an example embodiment having one or more features of the robot system of any of the previous paragraphs, the support comprises at least one linear track that establishes a plurality of possible locations of the base.

In an example embodiment having one or more features of the robot system of any of the previous paragraphs, the support comprises at least one eccentrically rotatable platform that establishes a plurality of locations and orientations of the base.

In an example embodiment having one or more features of the robot system of any of the previous paragraphs, the cutting tool includes a saw blade.

In an example embodiment having one or more features of the robot system of any of the previous paragraphs, the cutting tool includes a fluid jet cutter.

The various features and advantages of at least one disclosed example embodiment will become apparent to those skilled in the art from the following detailed description. The drawings that accompany the detailed description can be briefly described as follows.

DETAILED DESCRIPTION

Figure 1:
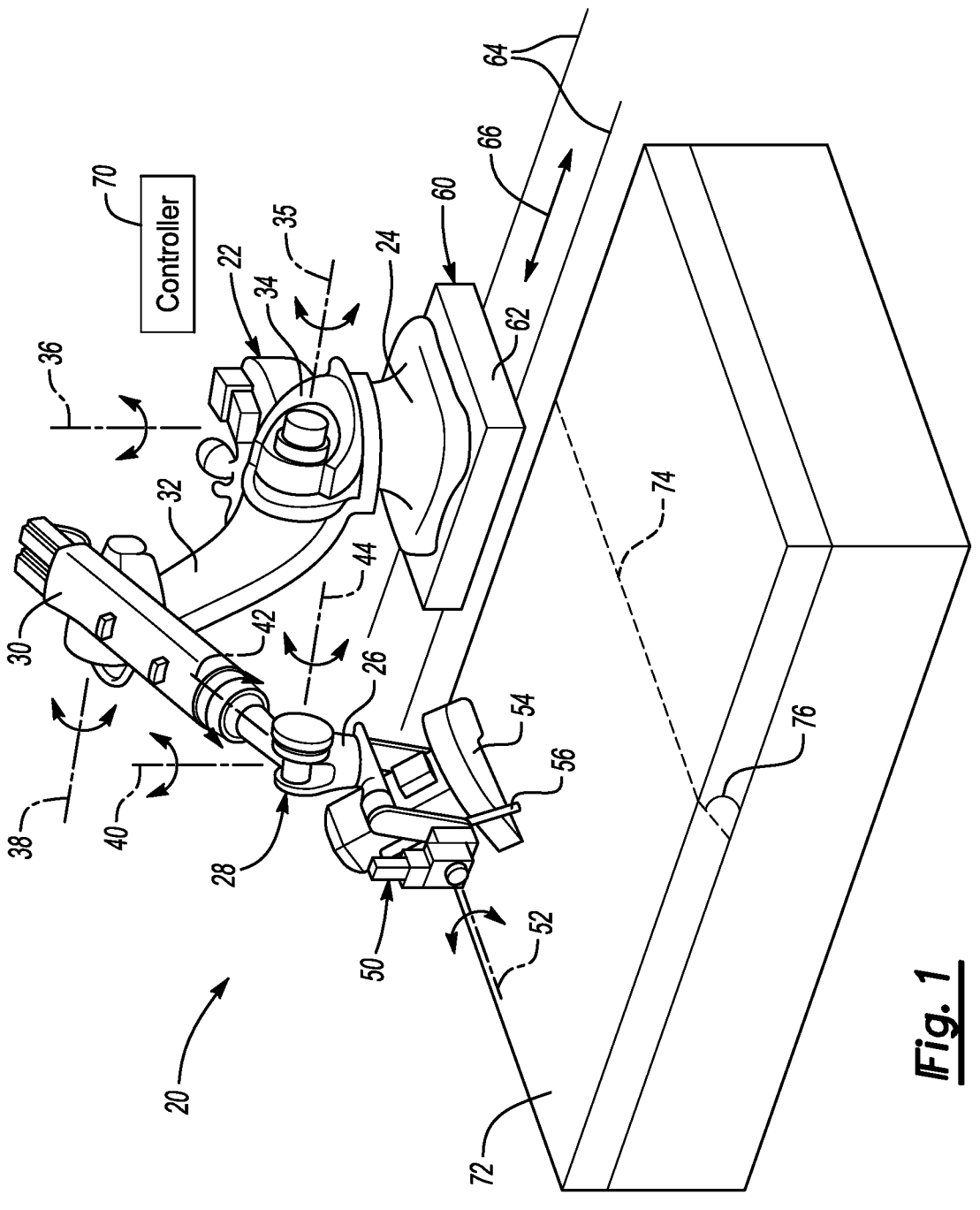
FIG. 1 diagrammatically and schematically illustrates a robot system designed according to an example embodiment.

FIG. 1 shows a robot system. A robot 22 includes a base 24 near one end and a wrist flange 26 near an opposite end. The robot 22 is an articulated robot that has a plurality of portions in series between the wrist flange 26 and the base 24. A wrist 28, which includes the flange 26, is near one end of a portion 30. Another portion 32 is situated between the portion 30 and another portion 34 that is situated adjacent the base 24. The portions 28, 30, 32, and 34 are moveable about respective axes relative to each other and the base 24. In this example embodiment there are six axes and the robot 22 may be referred to as a six-axis articulated robot.

The robot portion 32 is moveable relative to the portion 34 about an axis 35. The portion 34 is moveable relative to the base 24 about an axis 36. The robot portion 30 is moveable about an axis 38. The wrist 28 is moveable about axes 42 and 44. The wrist flange 26 is rotatable about an axis 40. The axes 35, 36, 38, 42, 44 and/or 40 may be established by respective rotary joints. The rotary joints may interconnect adjacent portions of the robot 22 which are rotatable relative to each other (e.g., portions 32, 34).

An end of arm tool 50 is secured to the wrist flange 26. The tool 50 is selectively moveable relative to the wrist flange 26 about a tool axis 52. The tool 50 in this example embodiment is a cutting tool including a saw blade 54 and a fluid jet cutter 56.

The base 24 is secured to a support 60 that is selectively moveable to change a location or orientation of the base 24. In the example embodiment of FIG. 1, the support 60 includes a platform 62 that is moveable along rails 64 to move the base 24 linearly along a path represented by the arrows 66.

A controller 70 includes at least one computing device, such as a processor and associated memory. The controller is programmed or otherwise suitably configured to control movement of the robot 24 and the tool 50 to accomplish a desired operation. For example, the controller causes respective motors associated with the joints (or axes) to operate in a manner that controls the positions of the robot portions and movement of those portions about the robot axes 35-44. The controller 70 also controls operation of a motor associated with the tool 50 for selectively adjusting the position of the saw blade 54 or fluid jet cutter 56 relative to the wrist flange 26.

The robot system 20 in FIG. 1 is arranged to cut a large slab of material 72, such as natural or manufactured stone. In particular, the robot system 20 is arranged to make at least one cut 74 in the slab 72 at an oblique angle to a primary face of the slab 72. An oblique angle, which is represented at 76, is greater than 0° and less than 90° relative to the primary face of the slab 72. The primary face of the slab 72 is that which has a surface area significantly larger than edges or sides of the slab 72. In many instances, the primary face of the slab 72 will be planar but a pure or true plane is not required for defining an oblique angle relative to that face of the slab 72. The term "planar" as used in this document should not be construed in a strict sense that requires a truly flat or planar surface.

Properly cutting a large slab at an oblique angle using an articulated, multi-axis robot presents challenges. A single cut, such as the cut 74, should be accomplished by moving the saw blade 54, for example, along the entire cutting path in one continuous and uninterrupted movement. Stopping at any point along the cutting path and repositioning the robot 22 typically results in a cut edge that is not properly finished, which requires additional machining that introduces additional cost and time. Additionally, it is necessary to avoid a singularity condition in which any two of the robot axes 35, 36, 38, 40, 42, 44 are colinear. Such singularity conditions are recognized as problematic because they introduce a theoretically infinite number of relative positions of at least two of the robot portions. The controller 70 is unable to accommodate singularity. Larger slabs of material present an increased risk of a singularity condition because the robot 22 has to move into positions at the extremes or limits of its working envelope.

The illustrated example robot system 20 is capable of making continuous and uninterrupted cuts at oblique angles along an entire cutting path, even along very large slabs, without encountering a singularity condition. The additional degrees of freedom provided by the moveable support 60 and the tool axis 52 allow the controller 70 to coordinate movement of the portions of the robot 22, movement of the support 60, and changes in the orientation of the cutting tool 50 relative to the wrist flange 26 to complete a continuous and uninterrupted cut along an entire cutting path while avoiding any singularities. The robot system 20 is capable of such cutting operations on very large slabs of material and makes use of the full extent of the reach of the robot 22.

The tool 50 is moveable relative to the wrist flange 26 without any risk of introducing a singularity. The tool axis 52 is not related to the robot axes 35-44 in a way that would introduce any singularity even if the tool axis 52 is colinear with any of the robot axes 35-44. The controller 70 coordinates the position or movement of the tool 50 about the tool axis 52 with the movement or position of the robot portions to achieve a desired cut at an oblique angle, but the tool axis 52 is not included in any determination of the necessary positions of the robot portions so the tool axis 52 cannot be a source of a singularity.

Figure 2:
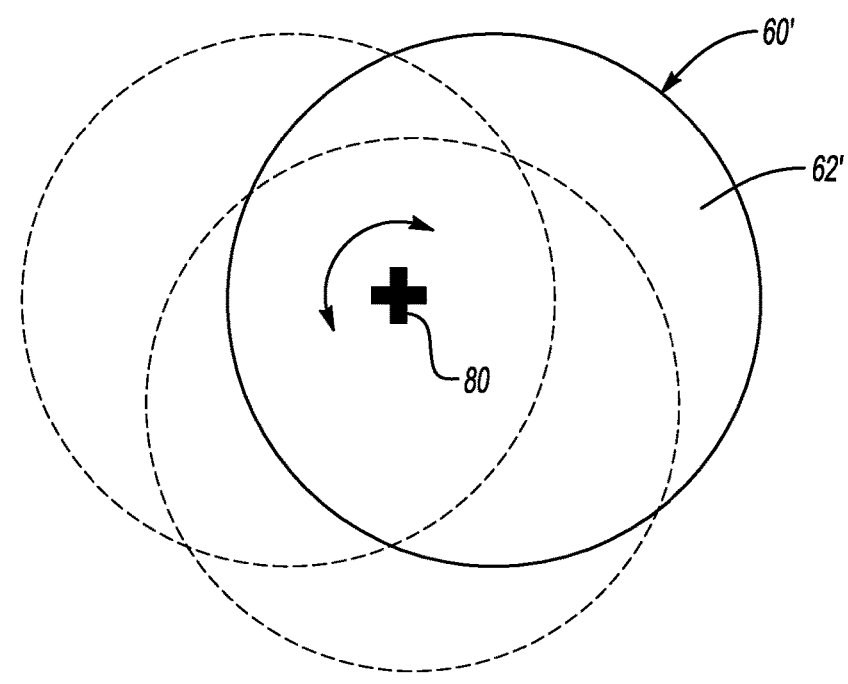
FIG. 2 schematically illustrates selected features of another example embodiment of a robot system.

The support 60 shown in FIG. 1 facilitates linear movement of the base 24 to change a location of the base 24 relative to the slab 72. Another support 60' is schematically illustrated in FIG. 2. In this embodiment, the support 60' includes a platform 62' that is eccentrically rotatable about an axis 80 that is not aligned with a center of the platform 62'. The controller 70 (FIG. 1) controls movement of the platform 62' to change a location and orientation of the base

24 during a cutting motion as needed to achieve uninterrupted cutting along a continuous cutting path and avoid singularity.

One example embodiment includes a platform 62' that is eccentrically rotatable and moveable along linear rails 64 (FIG. 1) to further extend the range of possible locations and orientations of the base 24.

Figure 3:
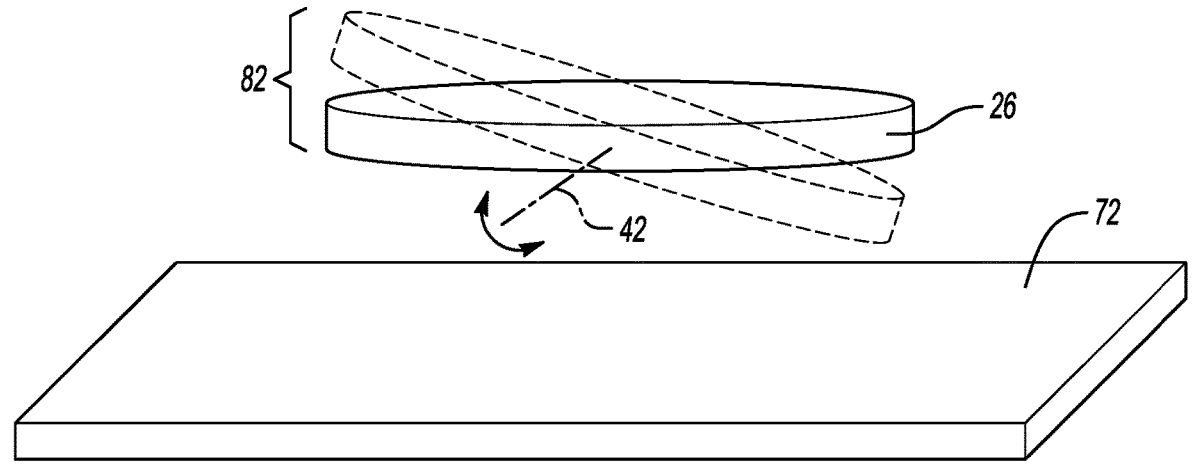
FIG. 3 schematically illustrates controlling an orientation of a robot wrist flange in an example embodiment.

One aspect of the manner in which the controller 70 avoids singularity includes maintaining an orientation of the wrist flange 26 relative to the primary face of the slab 72 within a selected and limited range. FIG. 3 schematically shows the wrist flange 26 oriented parallel to the primary face of the slab 72. When the primary face of the slab 72 faces upward (as shown in FIG. 1), the wrist flange 26 can be kept in a wrist-down orientation. In that position, the robot axis 40 is never aligned with another of the robot axes, which contributes to avoiding singularity.

In some embodiments, the controller 70 is programmed to keep the wrist flange 26 as close to parallel with the slab primary face (or another reference plane) as often as possible. Some deflection of the wrist flange relative to the slab primary face is possible when the orientation of the tool 50 is not adjustable to achieve a necessary tool position without increasing a risk of singularity. In one example embodiment, the controller 70 limits changes in position of the wrist flange 26 within a relatively small range schematically represented at 82. One example range is between 0° and 25°. Another example range is between 0° and 15°. In some embodiments, the orientation of the wrist flange is generally kept parallel to the primary face of the slab being cut and adjustable up to an angle of 10°.

Embodiments like those illustrated in the drawings and discussed above provide the ability to use a multi-axis articulated robot for a wider variety of operations. For example, such embodiments make it possible to make accurate, oblique angle cuts in very large slabs of material by moving a cutting tool in a continuous and interrupted manner along an entire cutting path.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A robot system, comprising:
an articulated robot including a base near one end, a wrist flange near an opposite end, and a plurality of robot portions between the base and the wrist flange, the robot portions being moveable about respective axes relative to at least one other of the robot portions;
a cutting tool secured to the wrist flange, the cutting tool being selectively moveable about at least one tool axis to change an angle of orientation of the cutting tool relative to the wrist flange; and
a controller that is configured to coordinate movement of the plurality of robot portions with at least one change in the angle of orientation of the cutting tool relative to the wrist flange to move the cutting tool in an uninterrupted manner along a continuous cutting path to cut a slab of material at a first angle relative to a primary face of the slab while avoiding a singularity condition in which any two of the respective axes are collinear;
wherein the controller is configured to maintain the wrist flange in an orientation relative to the primary face of the slab along the continuous cutting path such that an angle between the wrist flange and the primary face of the slab is between 0° and 25°.

2. The robot system of claim 1, wherein the first angle is an oblique angle.

3. The robot system of claim 1, wherein the angle between the wrist flange and the primary face of the slab is between 0° and 15°.

4. The robot system of claim 1, wherein the angle between the wrist flange and the primary face of the slab is up to 10°.

5. The robot system of claim 1, wherein the controller is configured to maintain the wrist flange parallel to the primary face of the slab along the continuous cutting path.

6. The robot system of claim 1, further comprising:
a support secured to the base, the support being moveable for selectively changing at least one of a location or an orientation of the base.

7. The robot system of claim 6, wherein the controller is configured to coordinate movement of the plurality of robot portions with movement of the support and the at least one change in the angle of orientation to move the cutting tool along the continuous cutting path while avoiding the singularity condition.

8. The robot system of claim 7, wherein the support comprises at least one linear track that establishes a plurality of possible locations of the base.

9. The robot system of claim 7, wherein the support comprises at least one eccentrically rotatable platform that establishes a plurality of locations and orientations of the base.

10. The robot system of claim 1, wherein the cutting tool includes a saw blade and/or a fluid jet cutter.

11. A method of operating a robot system, comprising:
securing a cutting tool to a wrist flange of an articulated robot, wherein the wrist flange interconnects the cutting tool and a plurality of robot portions;
moving one or more of the robot portions about a respective axis relative to at least one other of the robot portions;

changing an angle of orientation of the cutting tool relative to the wrist flange; and moving the cutting tool in an uninterrupted manner along a continuous cutting path to cut a workpiece at a first angle relative to a primary face of the workpiece while avoiding a singularity condition in which any two of the respective axes of the robot portions are collinear, including maintaining the wrist flange in an orientation relative to the primary face of the workpiece along the continuous cutting path such that an angle between the wrist flange and the primary face of the workpiece is ween 0° and 25°.

12. The method of claim 11, wherein the first angle is an oblique angle.

13. The method of claim 11, wherein the step of moving the cutting tool includes maintaining the wrist flange parallel to the primary face of the workpiece along the continuous cutting path.

14. The method of claim 11, wherein:
the plurality of robot portions extend between the wrist flange and a base; and
the step of moving the cutting tool includes changing at least one of a location or an orientation of the base.

15. The method of claim 14, wherein the changing of the location of the base includes moving the base relative to at least one linear track.

16. The method of claim 11, wherein the workpiece is a slab of material.

17. The method of claim 11, wherein the cutting tool includes a saw blade.

18. The method of claim 17, wherein the cutting tool includes a fluid jet cutter spaced apart from the saw blade.

19. The method of claim 11, wherein the cutting tool includes a fluid jet cutter.

* * * * *